(12) United States Patent
Dorman (10) Patent No.: US 7,669,802 B2
(45) Date of Patent: Mar. 2, 2010

(54) SPACE BASED ORBITAL KINETIC ENERGY WEAPON SYSTEM

(75) Inventor: John Dorman, Midland, TX (US)

(73) Assignee: Scapa Flow, LLC, Midland, TX (US)

( * ) Notice: Subject to any disclaimer, the term of this patent is extended or adjusted under 35 U.S.C. 154(b) by 868 days.

(21) Appl. No.: 11/312,972

(22) Filed: Dec. 20, 2005

(65) Prior Publication Data

US 2009/0321579 A1 Dec. 31, 2009

Related U.S. Application Data

(60) Provisional application No. 60/683,568, filed on May 23, 2005.

(51) Int. Cl.
*B64G 1/10* (2006.01)
(52) U.S. Cl. ............... 244/158.1; 244/159.1; 89/1.11; 102/518
(58) Field of Classification Search ............. 244/158.1, 244/158.4, 158.9, 159.1; 89/1.11; 102/518
See application file for complete search history.

(56) References Cited

U.S. PATENT DOCUMENTS

| | | | | |
|---|---|---|---|---|
| 3,395,035 | A * | 7/1968 | Strauss | 523/179 |
| 3,498,222 | A * | 3/1970 | Birkigt | 102/518 |
| 3,589,644 | A | 6/1971 | Salkeld et al. | |
| 4,907,485 | A | 3/1990 | Westphal et al. | |
| 5,056,740 | A | 10/1991 | Roth et al. | |
| 5,090,642 | A | 2/1992 | Salkeld | |
| 5,297,492 | A * | 3/1994 | Buc | 102/521 |
| 5,421,540 | A | 6/1995 | Ting | |
| 5,649,488 | A | 7/1997 | Morrison et al. | |
| 6,241,192 | B1 * | 6/2001 | Kondo et al. | 244/158.4 |
| 6,868,316 | B1 * | 3/2005 | Stevens | 701/13 |
| 7,437,996 | B2 * | 10/2008 | Turner et al. | 102/489 |
| 2003/0010868 | A1 | 1/2003 | McDermott et al. | |

OTHER PUBLICATIONS

Eric Adams, Is This What War Will Come to?, May 5, 2004, Popular Science, web article, www.popsci.com/military-aviation-space/article/2004-05/what-war-will-come, pp. 1-9.*
William H. Possel, Lt Col, USAF, Laser Weapons In Space: A Critical Assesment, Apr. 1998, Research Report, Air War College, Air University, pp. 1-4.*
Tim Weiner, "Air Force Seeks Bush's Approval for Space Weapons Programs", May 18, 2005, www.nytimes.com (5 Pages).
IP Law Bulletin "Black Patents' on the Rise, USPTO Statistics Show", Jul. 8, 2005, Portfolio Media, Inc. (4 Pages).

* cited by examiner

*Primary Examiner*—Timothy D. Collins
*Assistant Examiner*—Benjamin P Lee
(74) *Attorney, Agent, or Firm*—Gardere Wynne Sewell LLP; Karl L. Larson (57) ABSTRACT

A space based orbital kinetic energy weapon system and method of using same is provided. The space based orbital kinetic energy weapon system includes a satellite having a control system configured to maintain an orbit in outer space around the earth and to deorbit the satellite on a desired trajectory corresponding to an earth based target upon a command, and a projectile object operably connected to the satellite. The projectile object includes a dense mass and a heat shield operably surrounding the mass such that at least a portion of the mass survives reentry into the earth's atmosphere and strikes the earth based target delivering its kinetic energy.

24 Claims, 6 Drawing Sheets

Mass of U238: 18.95 gm/cm³
Radius: 25 cm
Volume formula: $(4/3)\pi r^3$
Volume: 65,450 cm³
Projectile Mass: 1240.3 kg

Orbital Velocity

Altitude: 225.3 km (140 miles)
Velocity: 7773 m/s (17,388 mph)

Velocity formula:

$$\sqrt{((1.408 \times 10^{16})/((3960+A^1)*5280))}$$

Orbital Period

Orbital Period: 89 min.
Orbital Period formula:

$$=\sqrt{((4\pi^2)*((((3960+A)*5280))^3)/ 1.408 \times 10^{16}}$$

Number of Satellites: 25

Frequency: 3.56 min (3:34)

A=Altitude in miles. 3960 is the distance to the center of the earth in miles

Figure 5

SPACE BASED ORBITAL KINETIC ENERGY WEAPON SYSTEM

CROSS REFERENCE TO RELATED APPLICATIONS

The present document claims the benefit of the earlier filing date of U.S. provisional patent application Ser. No. 60/683,568, entitled "SPACE BASED ORBITAL KINETIC ENERGY WEAPON SYSTEM," filed in the U.S. Patent and Trademark Office on May 23, 2005, and having a common inventor as the present document, the entire contents of which is incorporated herein by reference.

BACKGROUND OF THE INVENTION

1. Field of the Invention

The present invention relates to space based weapon systems and more particularly, relates to a space based orbital kinetic energy weapon system and related methods for implementing and operating the same.

2. Discussion of the Background

Throughout the history of armed conflict strategic weapons have evolved to become more powerful, more accurate, and more quickly deployed. The catapult gave rise to the cannon from which artillery eventually evolved. The range and caliber of artillery increased over time but eventually artillery began to reach its practical limit thereby creating the need for a new weapons platform.

New weapons platforms such as bomber airplanes extended the practical limits of artillery. Even though the earliest bombers did not have the destructive power of artillery, they were able to deliver their payload much further than artillery. Bombers progressed in both size and range eventually obtaining the capability of intercontinental warfare in the early 1950s. Like the artillery before them, however, they also reached their practical limit.

Newer weapons systems were developed to overcome the limitations of the bomber including the intercontinental ballistic missile (ICBM). The ICBM was just as powerful as the bomber but with a farther range. The big advantage of this system, however, was the relatively short time needed for the ICMB to reach its target. The bombers, even if kept on flight alert, could not reach a distant target around the world in under 10 hours, whereas an ICBM could reach its target in a little under an hour.

While the ICBM can strike a target anywhere on earth, it has reached its limit regarding the time it takes to engage a selected target. Other more extreme weapons, such as nuclear warheads have politically undesirable ramifications, and the destructive capability of conventional warheads is not appreciably progressing. Thus, there exists an unmet need in the art to deliver destructive energy more efficiently and effectively.

SUMMARY OF THE INVENTION

Accordingly, one aspect of the present invention is to provide a space based orbital kinetic energy weapon system that includes a satellite having a control system configured to maintain an orbit in outer space around the earth and to deorbit the satellite on a desired trajectory corresponding to an earth based target upon a command, and a projectile object operably connected to the satellite. The projectile object includes a dense mass and a heat shield operably surrounding the mass such that at least a portion of the mass survives reentry into the earth's atmosphere and strikes the earth based target delivering its kinetic energy.

Another aspect of the present invention is to provide a space based orbital kinetic energy weapon system that includes a plurality of satellites and a plurality of projectile objects. Each satellite includes a control system configured to maintain an orbit in outer space around the earth and to deorbit the satellite on a desired trajectory corresponding to an earth based target upon a command. Each projectile object includes a dense mass and a heat shield operably surrounding the mass such that a substantial portion of the mass survives reentry into the earth's atmosphere and strikes the earth based target delivering its kinetic energy. Each projectile object is operably connected to a corresponding one of the satellites.

Yet another aspect of the present invention is to provide a space based orbital kinetic energy weapon system that includes a satellite having an orbit in outer space around the earth and a plurality of projectile objects. Each projectile object is detachably connected to a corresponding one of the satellites. Each projectile object includes a dense mass, a heat shield operably surrounding the mass, and a control system configured to deorbit the payload on a desired trajectory corresponding to an earth based target upon command. The heat shield is configured to survive reentry into the earth's atmosphere. Each projectile object is configured to strike the earth based target delivering its kinetic energy.

Another aspect of the present invention is to provide a method for implementing an orbital kinetic energy weapon system that includes launching a plurality of satellites into earth orbits, maintaining an orbital path for each of the satellites, upon command, deorbiting at least one satellite on a desired trajectory, and striking one or more earth based locations with one or more projectile objects. Each satellite includes the one more projectile objects and a control system. Each projectile object comprises a dense mass and a heat shield operably surrounding the mass such that a substantial portion of the mass survives reentry into the earth's atmosphere and strikes the earth based target delivering its kinetic energy. The orbital path for each of the satellites is maintained using the respective control systems. The at least one satellite on a desired trajectory is deorbited using the respective control systems.

Another aspect of the present invention is to provide a method for implementing an orbital kinetic energy weapon system that includes launching a plurality of satellites into earth orbits, maintaining an orbital path for each of the satellites using the respective control systems, and, upon command, deorbiting at least one satellite on a desired trajectory using the respective control systems. Each satellite includes one more projectile objects and a control system, and each projectile object comprises a dense mass. The method further includes heat shielding the mass such that at least a portion of the mass survives reentry into the earth's atmosphere, and striking one or more earth based locations with the projectile objects and delivering a kinetic energy.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Today there exists a new kind of warfare. Information on the battlefield is more quickly processed and targets are more quickly acquired. There exists a need for weapon systems that are more powerful and which can be quickly deployed. The present invention provides a more destructive capability than any previous system and can reach its target in minutes rather than hours. Additionally, the present invention is impervious to any known defense system.

The present invention provides a space based orbital kinetic energy system that includes one or more weapon system satellites orbiting the earth from space. Kinetic energy is energy of motion. The kinetic energy of an object is the energy it possesses because of its motion. The kinetic energy (KE) of an object may be calculated by the formula:

$$KE = \frac{1}{2}mv^2$$

where m and v represent the mass and velocity of the object, respectively.

Figure 1A:
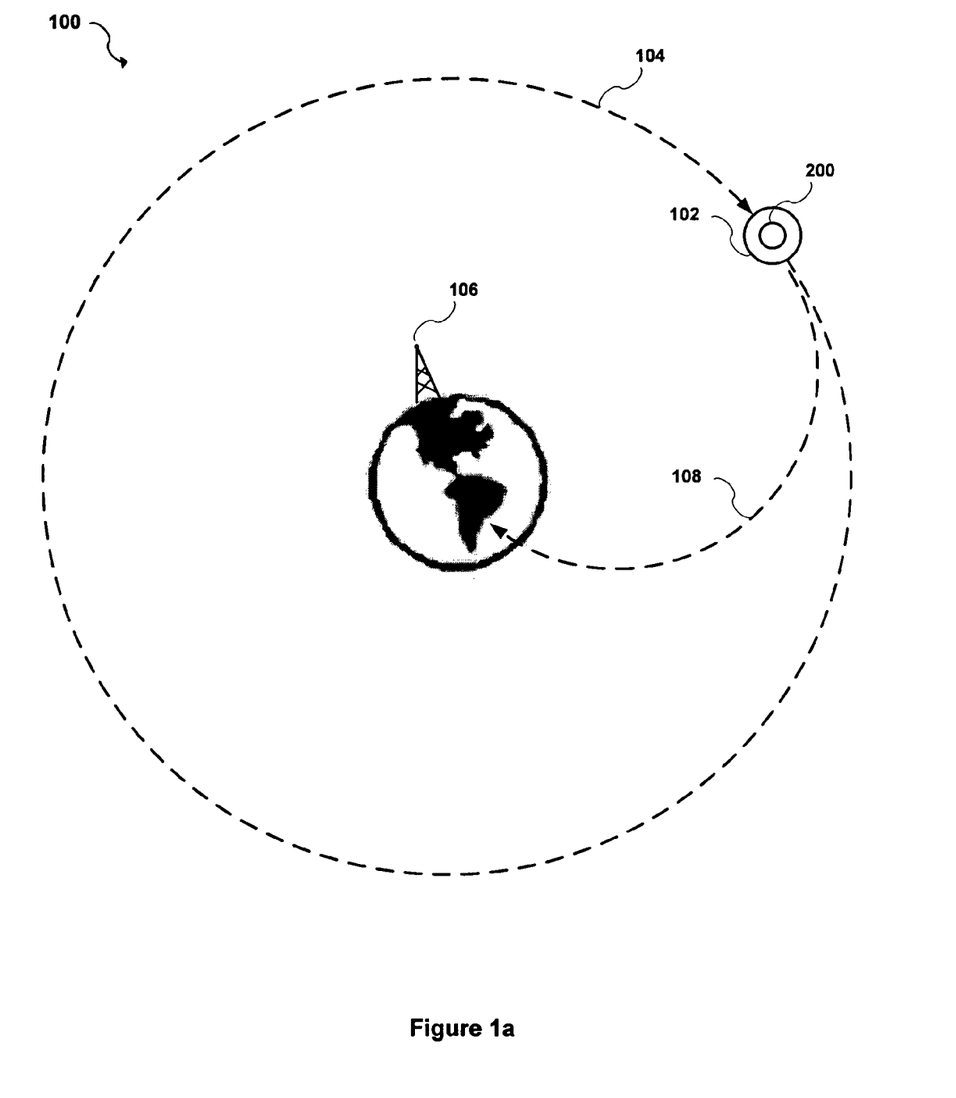
FIG. 1a illustrates a space based weapon system satellite having a heat shielded projectile according to the present invention.

When an object re-enters the Earth's atmosphere, air friction can produce external surface temperatures as high as 3,000 degrees Fahrenheit. Each weapon system satellite includes an orbital kinetic energy projectile having a heat shield configured such that at least a portion of the projectile is capable of surviving these extreme temperatures during reentry into the atmosphere. Referring to FIG. 1a, a space based weapon system satellite 102 having a heat shielded projectile 200 according to the present invention is shown. The weapon system satellite 102 may be of any configuration including, but not limited to, spherical, rectangular, or tubular. Each weapon system satellite 102 includes an on-board control system, having one or more processors, that is capable of maintaining a precise orbit 104 around the earth by periodically adjusting the path and/or position of the weapon system satellite 102 using thrusters or similar means. The control system may include, among other functions, propulsion, power and communications systems. The control system may be configured to handle all weapon system satellite operations. However, the primary purpose of the control system is to maintain the orbit of the weapon system satellite 102 and to deorbit the weapon system satellite 102 satellite on a desired trajectory. The weapon system satellite 102 may also include propellant tanks, batteries and solar panels.

The control system may include several subsystems including, but not limited to, guidance, navigation, propulsion and communication subsystems. The guidance subsystem may include one or more magnetometers and gyroscopes for determining and maintaining the weapon system satellite 102 attitude, orientation and position. The communication subsystem may include one or more antennas, such as S-band OMNI antennas, for communication with communications link 106 and/or other weapon system satellites 102.

In one possible embodiment, the communication subsystem may consist of a transmitter, a receiver, a power amplifier, and multiple antennas utilizing off-the-shelf, low-cost wireless technologies. Separate antennas may be used for reception and transmission. For instance, the weapon system satellite 102 may receive commands on the VHF band and transmit on the UHF band, or visa-versa. The weapon system satellite 102 may utilize any conventional communication protocol, including the 802.11 IEEE standards. However, other configurations of the weapon system satellite 102 are possible.

Figure 2:
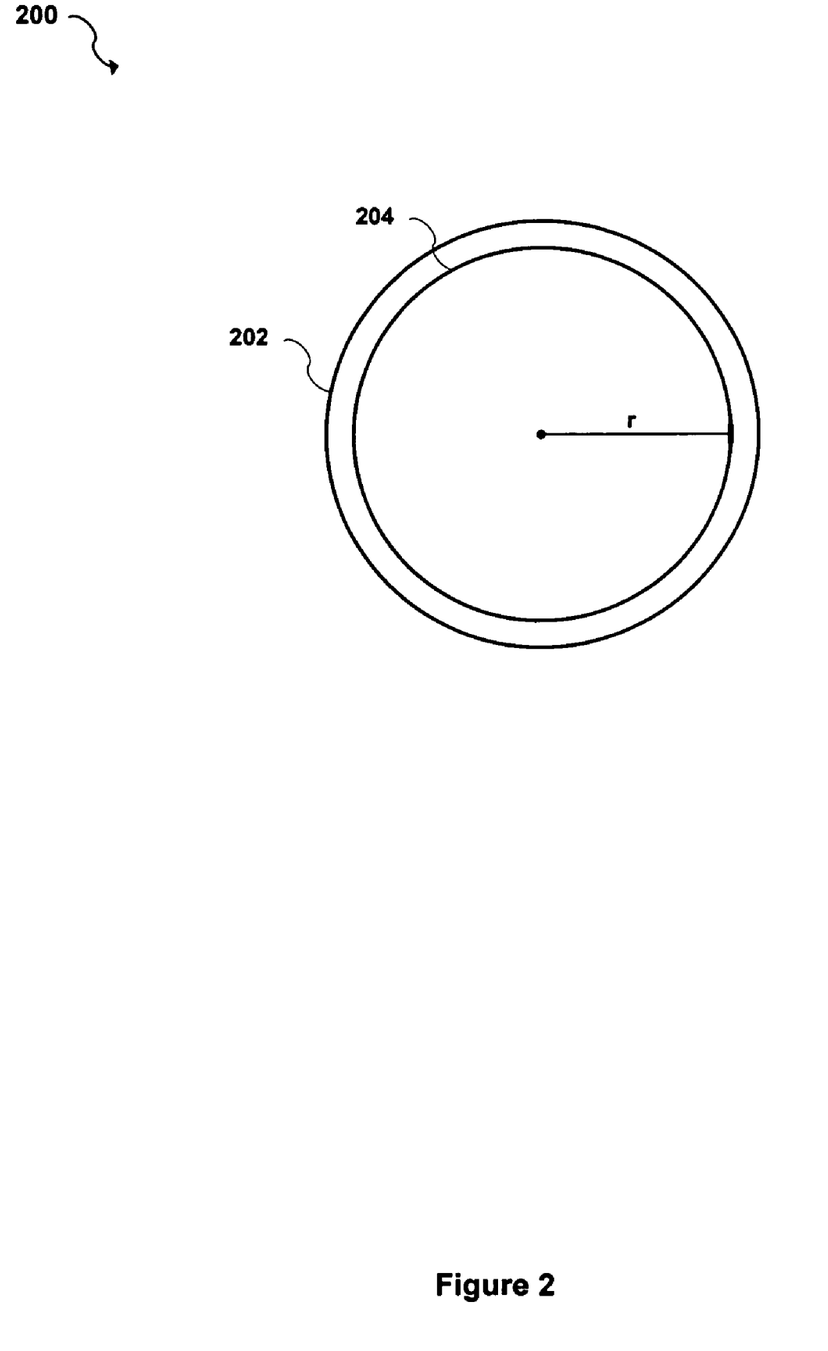
FIG. 2 illustrates the heat shielded projectile according to an exemplary embodiment of the present invention.

Each weapon system satellite 102 includes one or more heat shielded projectiles 200. The heat shielded projectiles 200 may be contained within the payload of the weapon system satellite 102, externally attached thereto or attached or coupled using any known or available configuration that is known in the art. Optionally, the heat shielded projectiles 200 may be contained within a separate carrier within or attached to the weapon system satellite 102. This optional carrier may be any shape, including but not limited to, spherical, cylindrical or rectangular. As shown in FIG. 2, each heat shielded projectile 200 includes a heat shield 202 and a projectile 204. The heat shield 202 may be any material that is capable of protecting at least a portion of the projectile 204 from the extreme heat of reentry into the atmosphere, including but not limited to, reinforced carbon-carbon (RCC), low- and high-temperature reusable surface insulation tiles, heat absorbing ceramic tiles or tiles formed from a silica fiber compound, and like materials. The heat shield 202 may include flame retardant materials, such as high-temperature reusable surface insulation (HRSI) and nylon felt nomex. The heat shield may also include external coatings such as borosilicate glass.

The projectile 204 may be any material having a dense mass. In one embodiment, the projectile 204 is a 1240 kilogram spheroid of depleted Uranium 238 with a radius of 25 cm. However, other shapes configurations for the projectile 204 are obviously possible within the scope of the present invention. Further, any dense material may be used instead of depleted Uranium 238.

Figure 5:
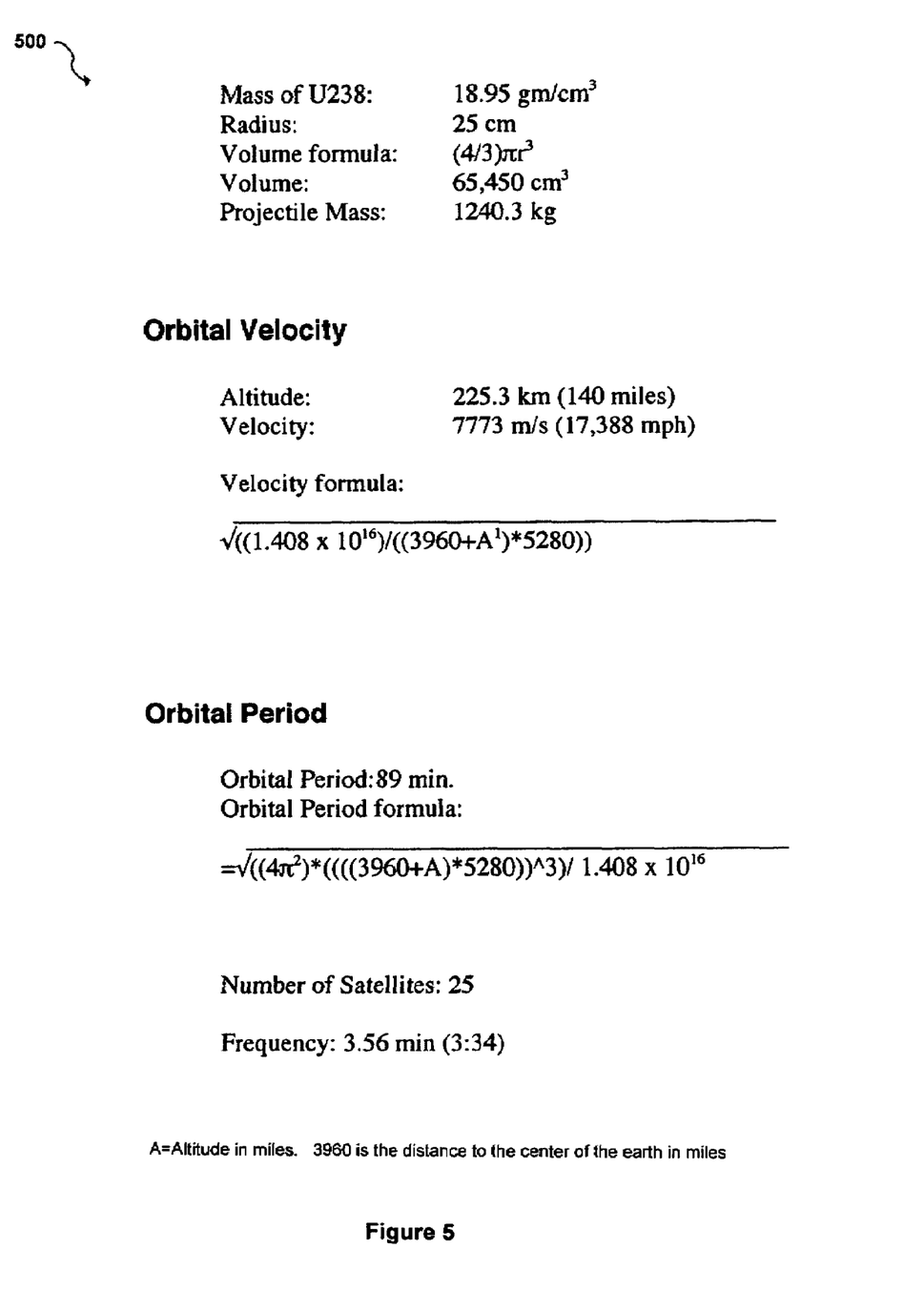
FIG. 5 are exemplary calculations according to an embodiment of the present invention.

Each weapon system satellite 102 is operable to orbit above the earth at a standard orbital velocity. According to one embodiment as illustrated by the calculations shown in FIG. 5, twenty-five weapon system satellites 102 orbit the earth 225 kilometers above the earth's surface at a speed of 7773 meters per second with an orbital period of 89 mm. As such, a weapon system satellite 102 could be configured to pass over a given point of the earth approximately every 3½ minutes.

Upon selection of an earth based target, a command to deorbit is sent to one or more weapon system satellites 102 via communication link 106. The deorbiting process is initiated. In one possible arrangement, the deorbiting process lowers the perigee of the orbit to 60 miles or less. One or more satellites are taken out of orbit on precise trajectories 108, each using on-board control systems and thrusters or similar means to adjust the attitude, orientation and position of each weapon system satellite 102 and to generally reduce its velocity to an amount less than necessary to keep it in orbit. The initial calculations of the amount and duration of thrust required to generally reduce the forward velocity of an object include, but are not limited to force (f) and time (t) calculations:

$$f = ma$$
$$t = \frac{v}{a}$$

where m, a, and v represent the mass, acceleration and velocity of the object, respectively.

In one possible embodiment, certain rendezvous braking maneuvers may be performed by thrusters to deorbit the weapon system satellite 102. An initial calculation of the precise trajectory 108 in approximately real time before the braking maneuvers is performed to determine the amount and duration of one or more braking maneuvers required in order to strike the earth based target. Braking may be accomplished by a thruster, liquid or solid rocket, electric propulsion systems or the like, and is performed as a series of distinct maneuvers performed at different intervals, based on feedback during the deorborting process. As such, minor adjustments to the deorbit trajectory of the weapon system satellite 102 may be performed to maintain its precise trajectory 108 and to compensate for dispersions due to navigation errors, impulse errors, ignition delays, or vehicle weight uncertainties.

In another possible embodiment, braking is performed by one or more burns of a predetermined amount of time by a thruster, liquid or solid rocket, or the like. An initial calculation of the precise trajectory 108 in approximately real time before the burn is performed to determine the amount and duration of one or more burns required in order to strike the earth based target. In this embodiment, feedback during the deorborting process is not provided and, thus, dispersions due to navigation errors, impulse errors, ignition delays, or vehicle weight uncertainties would not be corrected during reentry.

The precise trajectory 108 is selected such that a given location on the earth may be precisely targeted. In one embodiment, the weapon system satellites 102 are configured to burn up in the heat generated by re-entry into the atmosphere. In other embodiments, the weapon system satellites 102 may survive reentry completely or partially. The heat shield 202 protects the projectile 204 from the extreme heat of reentry into the atmosphere such that the projectile 204 survives reentry, either fully or partially, and strikes the earth based target with a massive destructive energy. In one embodiment the projectile 204 strikes its target with a destructive energy of 3.75×1010 Joules. Obviously, the destructive energy depends on the mass of the projectile 204 and its velocity. Optionally, the projectile 204 may include its own guidance system to precisely position the projectile as desired.

Targets of projectile 204 include, but are not limited to: (i) land based military targets such as above ground facilities and runways; (ii) hardened underground bunkers for which small yield nuclear weapons are being developed; and (iii) ships, including surface based and submarines.

Figure 3:
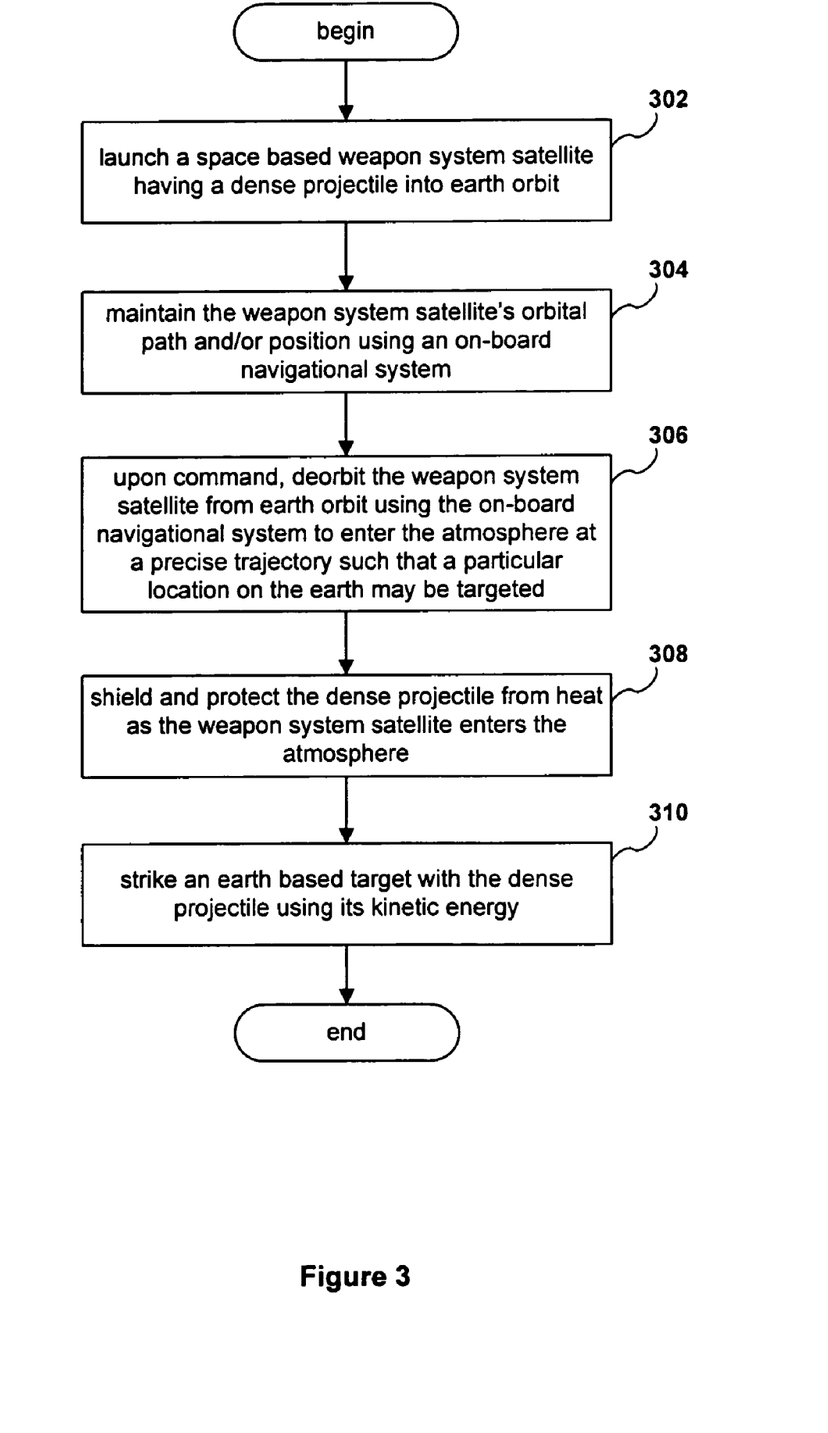
FIG. 3 is a flow chart for implementing a space based weapon system satellite according to an embodiment the present invention.

Referring to FIG. 3, a flow chart for implementing a space based weapon system satellite according to an embodiment of the present invention is shown. At block 302, the weapon system satellite 102 is launched into an orbital path 104 around the earth by conventional means that is known in the art, including but not limited to, the Lockheed Martin Titan IV and Atlas rockets, the Boeing Delta II and IV rockets, the European Space Agency (ESA) Ariane 5 rocket, and the United States National Aeronautics and Space Administration (NASA) Space Shuttle. The weapon system satellite 102 includes one or more heat shielded projectiles 200. At block 304, the weapon system satellite 102 uses an on-board control system to maintain the path and/or position of orbit 104 for weapon system satellite 102.

At block 306, an earth based target is selected and the weapon system satellite 102 is instructed to deorbit using communication link 106. The on-board control system deorbits weapon system satellite 102 on precise trajectory 108 such that a particular location on the earth may be targeted. In one embodiment, the calculations necessary to achieve precise trajectory 108 are calculated by the on-board control system based on a given earth based location, such as a latitude/longitude coordinate. Alternatively, the calculations necessary to achieve precise trajectory 108 may be calculated external to weapon system satellite 102 and transmitted via communication link 106. In other embodiments, two or more of the weapons system satellites may communicate with one another to assist with deorbit, desired trajectory, and/or selection of the appropriate weapons system satellite.

At block 308, heat shield 202 protects, at least partially, the projectile 204 from the extreme heat of reentry into the atmosphere. The projectile 204 then strikes the earth based target delivering its kinetic energy, as shown at block 310.

Figure 1B:
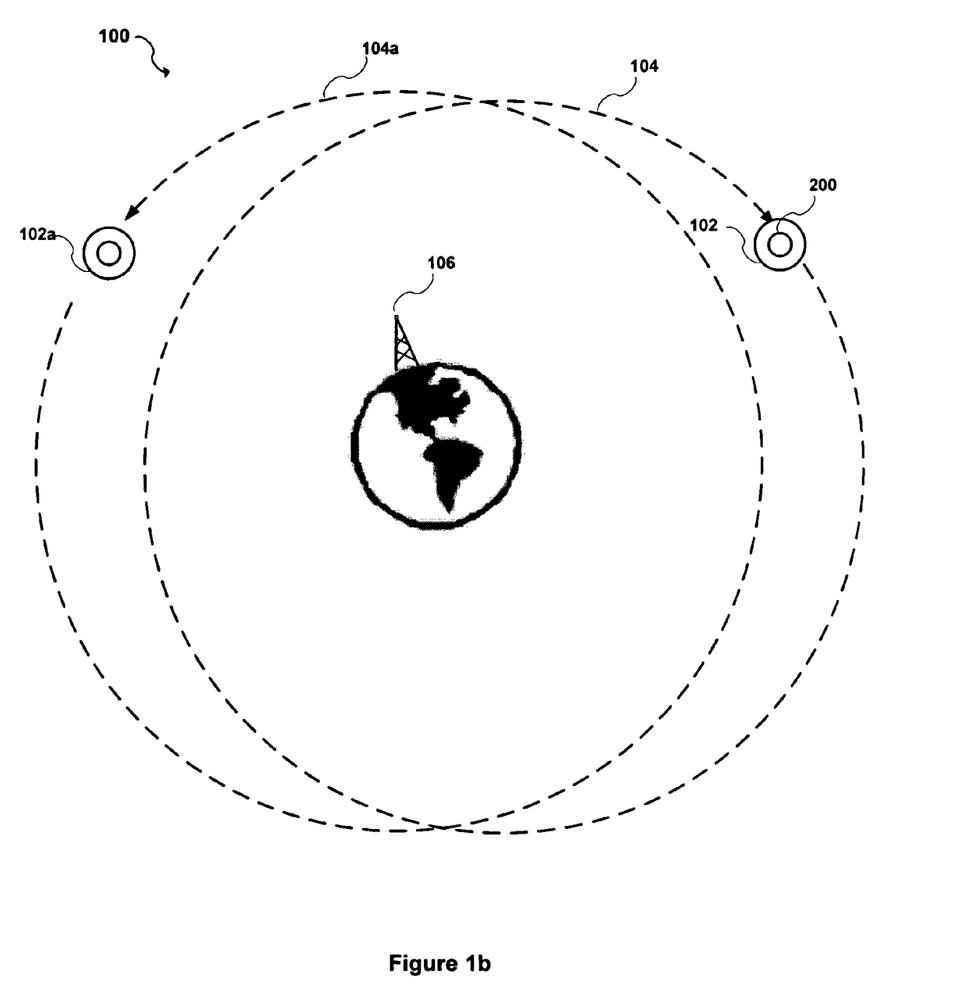
FIG. 1b illustrates multiple space based weapon system satellites according to the present invention.
Figure 4:
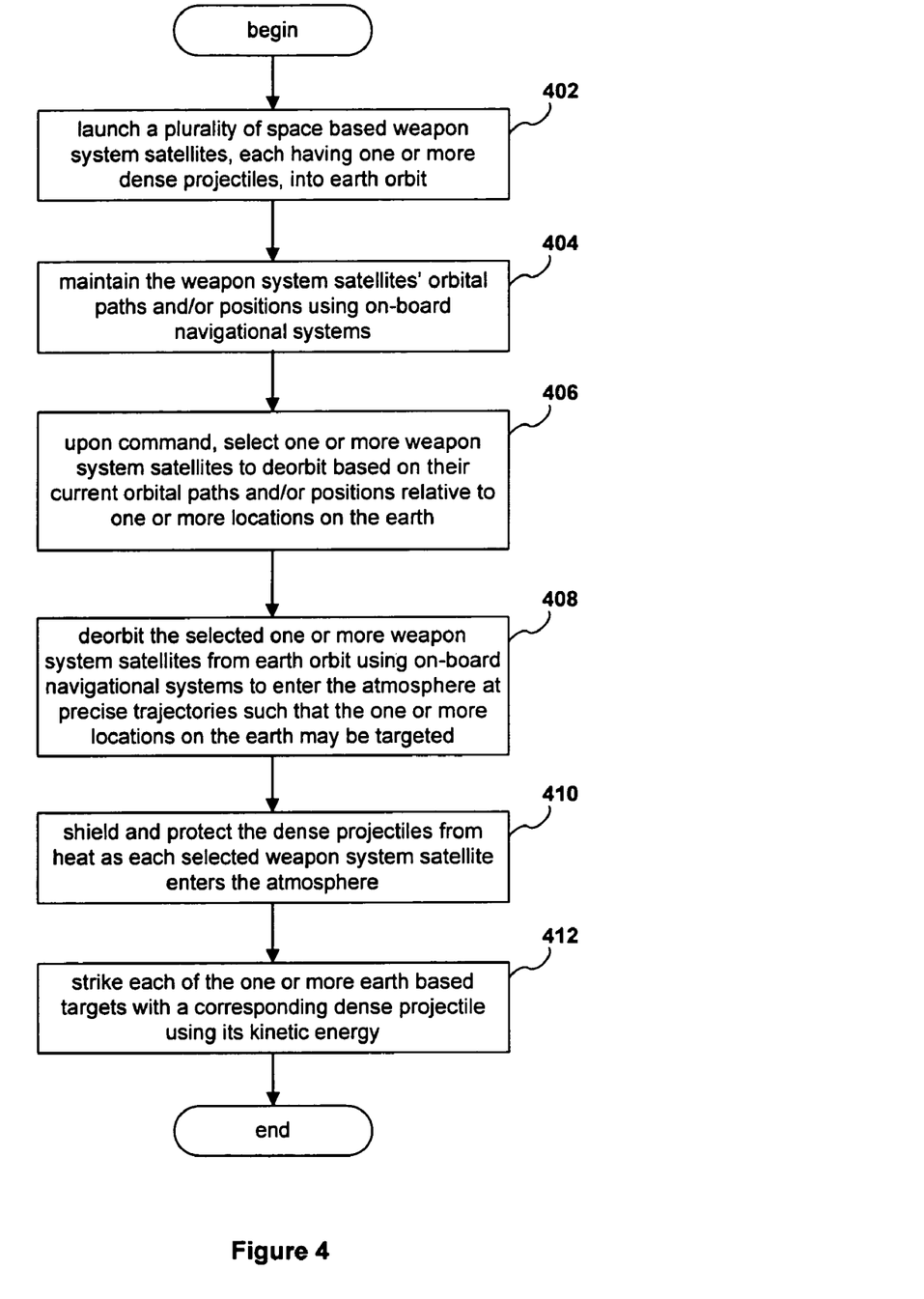
FIG. 4 is flow chart for implementing a plurality of space based weapon system satellites according to an embodiment of the present invention.

Referring to FIG. 4, a flow chart for implementing a plurality of space based weapon system satellites 102 according to one embodiment of the present invention is shown. At block 402, a plurality of weapon system satellites 102 are launched into orbital paths 104 around the earth using conventional means that is known in the art. The present invention is not limited to any particular orbital path 104. For instance, the orbital paths 104 for the weapon system satellites 102 may be spaced in a pattern parallel to each other, crossing at angles, or any other conceivable pattern. FIG. 1b shows multiple weapon system satellites 102 and 102a having orbital paths 104 and 104a of different directions. Several weapon system satellites 102 may also be placed in a geosynchronous orbit. If speed to target is a primary objective, the orbital paths 104 of the weapon system satellites 102 are configured such that a minimal amount of time is required to deorbit a selected weapon system satellite 102 to a precise trajectory 108 based on the earth based location.

The weapon system satellite 102 includes one or more heat shielded projectiles 200. Optionally, the heat shielded projectiles 200 may be of different shapes, sizes and masses selected for the optimal destruction of a given earth based target. For instance, a larger heat shielded projectile 200 may be desired to strike a heavily fortified bunker whereas a smaller heat shielded projectile 200 may be desired to strike a building within close proximity to other non-targeted buildings. Further, each weapon system satellite 102 may be configured with a single large projectile 104 or multiple smaller projectiles 104 selected for the optimal destruction of a given earth based target.

At block 404, the weapon system satellites 102 each use an on-board control system to maintain its path and/or position of orbit 104. At block 406, one or more weapon system satellites 102 are selected based on their current orbital paths and/or positions relative one or more earth based targets. The selected weapon system satellites 102 are instructed to deorbit using communication link 106 based on their current orbital paths and/or positions relative the targets, as shown at block 408. The on-board control system deorbits each selected weapon system satellite 102 on precise trajectory 108 such that a particular location on the earth may be targeted.

At block 410, heat shield 202 protects the projectile 204 as each selected weapon system satellite 102 enters the atmosphere. One or more earth based targets are struck with the selected orbital kinetic energy projectiles 204, as shown at block 412.

The processes and mechanisms set forth in the present description may be implemented using a conventional general purpose microprocessor, or silicon as part of a special purpose chip and/or subsystem, programmed according to the teachings in the present specifications, as will be appreciated to those skilled in the relevant art. Appropriate software can be prepared based upon the teachings of the present disclosure, as will also be apparent to those skilled in the relevant arts.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A space based orbital kinetic energy weapon system, comprising:
   a weapon satellite having one or more thrusters and an onboard control system configured to maintain an orbit in outer space around the earth and to deorbit the weapon satellite using the one or more thrusters on a desired trajectory targeting an earth based location upon a command, wherein the command is communicated directly in real-time from an earth based location, and wherein minor adjustments are performed by the one or more thrusters controlled by control system such that the weapon satellite maintains the desired trajectory during reentry into the earth's atmosphere; and
   a projectile object operably connected to the weapon satellite, wherein the projectile object comprises a dense mass and a reentry heat shield operably surrounding the mass such that at least a portion of the mass survives the weapon satellite's reentry into the earth's atmosphere and strikes the earth based location delivering its kinetic energy; and
   the reentry heat shield is configured to protect the mass but not the weapon satellite.

2. The system of claim 1, wherein the earth based location is destroyed through kinetic energy.

3. The system of claim 1, wherein the weapon satellite includes an interior space surrounding the projectile object.

4. The system of claim 1, wherein the projectile object is externally connected to the weapon satellite.

5. The system of claim 1, wherein the control system is configured to adjust at least one of an orbital path and an orbital position of the weapon satellite.

6. The system of claim 1, wherein the mass comprises a spheroid of depleted Uranium 238.

7. The system of claim 1, wherein the orbit comprises a geosynchronous orbit.

8. The system of claim 1, wherein the desired trajectory is calculated by the control system of the weapon satellite.

9. The system of claim 8, wherein the weapon satellite is deorbited by the thruster burned for a predetermined duration.

10. The system of claim 8, wherein the weapon satellite is deorbited by one or more thrusters fired one or more times.

11. The system of claim 10, wherein the one or more thrusters are fired based on feedback during the deorbiting process.

12. The system of claim 1, wherein the desired trajectory is communicated in real-time from the earth based location.

13. The system of claim 1, wherein the mass in its entirety survives reentry into the earth's atmosphere.

14. The system of claim 1, wherein the reentry heat shield comprises one or more tiles.

15. The system of claim 14, wherein the one or more tiles comprise one or more ceramic tiles.

16. The system of claim 1, wherein the reentry heat shield is configured to protect the mass but not the weapon satellite.

17. A space based orbital kinetic energy weapon system, comprising:
   a plurality of weapon satellites, wherein each weapon satellite includes one or more thrusters and an onboard control system configured to maintain an orbit in outer space around the earth and to deorbit the weapon satellite on a desired trajectory targeting an earth based location upon a command, wherein the command is communicated in real-time from an earth based location to a selected weapon satellite, and wherein minor adjustments are performed by the one or more thrusters controlled by control system such that the selected weapon satellite maintains the desired trajectory during reentry into the earth's atmosphere; and
   a plurality of projectile objects, wherein each projectile object comprises a dense mass and a reentry heat shield operably surrounding the mass such that a substantial portion of the mass
   survives the weapon satellite's reentry into the earth's atmosphere and strikes the earth based location delivering its kinetic energy, each projectile object is operably connected to a corresponding one of the
   weapon satellites; and
   the reentry heat shield is configured to protect the mass but not the weapon satellite.

18. The system of claim 17, wherein the earth based location is destroyed through kinetic energy.

19. The system of claim 17, further comprising a communication network, wherein at least one of the weapon satellites is in communication with at least one other weapon satellite over the communication network.

20. The system of claim 19, wherein the command is communicated in real-time from an earth based location to a selected weapon satellite using one or more other weapon satellites over the communication network.

21. The system of claim 20, wherein the selected weapon satellite is selected based on its proximity to the earth based location.

22. The system of claim 17, wherein at least one weapon satellite orbit is different from at least one other weapon satellite orbit.

23. The system of claim 17, wherein the reentry heat shield is configured to protect the mass but not the selected weapon satellite.

24. A space based orbital kinetic energy weapon system, comprising:
- a weapon satellite having an orbit in outer space around the earth, wherein the weapon satellite includes one or more thrusters; and
- a control system onboard the weapon satellite configured to deorbit the payload on a desired trajectory targeting an earth based location upon command, wherein the command is communicated directly in real-time from an earth based location, and wherein minor adjustments are performed by the one or more thrusters controlled by control system such that the weapon satellite maintains the desired trajectory during reentry into the earth's atmosphere;
- a plurality of projectile objects, wherein each projectile object is detachably connected to the weapon satellite, each projectile object comprises:
- a dense mass; and
- a reentry heat shield operably surrounding the mass, wherein the reentry heat shield is
- configured to survive the weapon satellite's reentry into the earth's atmosphere, and the projectile object is configured
- to strike the earth based location delivering its kinetic energy; and the reentry heat shield is configured to protect the mass but not the weapon satellite.

\* \* \* \* \*